United States Patent
Stojkovic et al.

(10) Patent No.: US 11,034,201 B2
(45) Date of Patent: Jun. 15, 2021

(54) VEHICLE HITCH ASSEMBLY HAVING FLOATING HITCH RECEIVER AND METHOD

(71) Applicant: Ford Global Technologies, LLC, Dearborn, MI (US)

(72) Inventors: Dragan B. Stojkovic, Taylor, MI (US); Jack Marchlewski, Saline, MI (US); Joshua Robert Hemphill, White Lake, MI (US); Robert Reiners, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

(21) Appl. No.: 16/254,802

(22) Filed: Jan. 23, 2019

(65) Prior Publication Data

US 2020/0231013 A1    Jul. 23, 2020

(51) Int. Cl.
| | | |
|---|---|---|
| *B60D 1/44* | (2006.01) | |
| *B60D 1/48* | (2006.01) | |
| *B60D 1/06* | (2006.01) | |
| *B60D 1/167* | (2006.01) | |
| *B60D 1/66* | (2006.01) | |

(52) U.S. Cl.
CPC .............. *B60D 1/44* (2013.01); *B60D 1/48* (2013.01); *B60D 1/06* (2013.01); *B60D 1/167* (2013.01); *B60D 1/665* (2013.01)

(58) Field of Classification Search
CPC ... B60D 1/44; B60D 1/48; B60D 1/54; B60D 1/363; B60D 1/06; B60D 1/167
See application file for complete search history.

(56) References Cited

U.S. PATENT DOCUMENTS

| | | | | |
|---|---|---|---|---|
| 1,542,581 A | * | 6/1925 | Prilipp | B60D 1/44 280/467 |
| 1,574,716 A | * | 2/1926 | Warren | B60D 1/44 280/447 |
| 2,745,680 A | * | 5/1956 | Jones | B60D 1/44 280/499 |
| 2,788,226 A | * | 4/1957 | Malone | B60D 1/44 280/447 |
| 2,947,551 A | * | 8/1960 | Reimers | B60D 1/44 280/499 |
| 2,973,971 A | * | 3/1961 | Oddson | B60D 1/40 280/479.3 |
| 3,126,210 A | | 3/1964 | Hill | |
| 3,243,202 A | * | 3/1966 | Carson | B60D 1/40 280/479.2 |
| 3,677,565 A | * | 7/1972 | Slosiarek | B60D 1/44 280/499 |
| 3,753,574 A | * | 8/1973 | Werle | B60D 1/44 280/479.2 |
| 4,153,132 A | | 5/1979 | Biedebach | |

(Continued)

*Primary Examiner* — Minnah L Seoh
*Assistant Examiner* — Michael R Stabley
(74) *Attorney, Agent, or Firm* — Raymond Coppiellie; Price Heneveld LLP

(57) ABSTRACT

A vehicle hitch assembly is provided that includes an angled trailer tow bar configured to be supported at the rear of a vehicle, a hitch receiver movably coupled to the tow bar such that the receiver may move on the tow bar, and a locking mechanism for locking the receiver in a fixed position on the tow bar.

16 Claims, 8 Drawing Sheets

(56) References Cited

U.S. PATENT DOCUMENTS

| | | | | |
|---|---|---|---|---|
| 4,770,436 A | * | 9/1988 | Anderson | B60D 1/44 |
| | | | | 280/463 |
| 4,773,667 A | * | 9/1988 | Elkins | B60D 1/40 |
| | | | | 280/479.3 |
| 5,009,446 A | * | 4/1991 | Davis | B60D 1/40 |
| | | | | 280/477 |
| 5,322,315 A | * | 6/1994 | Carsten | B60D 1/40 |
| | | | | 280/479.2 |
| 5,630,606 A | * | 5/1997 | Ryan | B60D 1/40 |
| | | | | 280/479.3 |
| 6,443,475 B1 | * | 9/2002 | Fegley | B60D 1/44 |
| | | | | 280/463 |
| 8,091,913 B1 | | 1/2012 | White | |
| 9,834,049 B2 | | 12/2017 | Strand | |
| 2018/0126811 A1 | * | 5/2018 | Shaffer | B60D 1/06 |

\* cited by examiner

VEHICLE HITCH ASSEMBLY HAVING FLOATING HITCH RECEIVER AND METHOD

FIELD OF THE INVENTION

The present invention generally relates to vehicle tow assemblies, and more particularly relates to a vehicle hitch assembly having a movable hitch receiver.

BACKGROUND OF THE INVENTION

Many motor vehicles are commonly equipped with a hitch assembly to enable the vehicle to tow a trailer. The hitch assembly typically includes a tow bar fixedly attached to a hitch receiver having a hitch connector ball or other connector for engaging a trailer coupler on a tongue on the front end of a trailer. To connect the trailer coupler to the hitch connector ball, the tow vehicle is typically backed up carefully by the driver so as to align the hitch connector ball with the trailer coupler. This alignment may be particularly difficult depending upon the terrain and ability of the driver. Any misalignment of the trailer coupler with the hitch ball may make the vehicle and trailer connection process difficult. It would be desirable to provide for a vehicle hitch assembly that may allow for connection of the trailer to the hitch despite misalignment of the trailer coupler and hitch ball.

SUMMARY OF THE INVENTION

According to one aspect of the present invention, a vehicle hitch assembly is provided. The vehicle hitch assembly includes an angled trailer tow bar configured to be supported at the rear of a vehicle, a hitch receiver movably coupled to the tow bar such that the receiver may move on the tow bar, and a locking mechanism for locking the receiver in a fixed position on the tow bar.

Embodiments of the first aspect of the invention can include any one or a combination of the following features:
the angled trailer tow bar has an angled portion at an angle greater than 3 degrees;
the angle is in the range of 3 to 25 degrees;
the angle is in the range of 5 to 10 degrees;
the receiver has upper and lower arms and a first pin at a front side extending between the upper and lower arms;
the tow bar has a slot, wherein the first pin engages the slot when the hitch receiver is in the fixed position to provide the locking mechanism;
the receiver further has a second pin rearward of the first pin such that the first and second pins are on opposite front and rear sides of the tow bar, and wherein the second pin fixedly connects the hitch receiver to the tow bar in the fixed position to further provide the locking mechanism;
the locking mechanism comprises a pair of articulating jaws that engage the first pin when positioned within the slot; and
the articulating jaws are spring biased by one or more springs.

According to another aspect of the present invention, a vehicle hitch assembly is provided. The vehicle hitch assembly includes a trailer tow bar having rearward angled members configured to be supported at the rear of a vehicle, a floating hitch receiver movably coupled to the tow bar such that the receiver is movable to different positions on the tow bar, and a locking mechanism for locking the receiver in a fixed position on the tow bar.

Embodiments of the second aspect of the invention can include any one or a combination of the following features:
the angled trailer tow bar has an angled portion at an angle greater than 3 degrees;
the angled portion has an angle in the range of 3 to 25 degrees;
the receiver has upper and lower arms and a first pin at a front side extending between the upper and lower arms;
the tow bar has a slot, wherein the first pin engages the slot when the floating hitch receiver is in the fixed position to provide the locking mechanism;
the receiver further has a second pin at a rearward of the first pin such that the first and second pins are on opposite front and rear sides of the tow bar, and wherein the second pin fixedly connects the receiver to the tow bar in the fixed position to further provide the locking mechanism;
the locking mechanism comprises a pair of articulating jaws that engage the first pin when positioned within the slot; and
the articulating jaws are spring biased by one or more springs.

According to yet another aspect of the present disclosure a method of connecting a trailer to a tow vehicle is provided. The method includes the steps of aligning a trailer coupler in position near an angled trailer tow bar on a vehicle, moving a floating hitch receiver on the tow bar to align the receiver with the trailer coupler, connecting the trailer coupler to the floating hitch receiver, sliding the floating hitch receiver on the tow bar to a rearward fixed position, and locking the receiver in the fixed position with a locking mechanism.

Embodiments of the third aspect of the invention can include any one or a combination of the following feature:
the step of moving the receiver to the fixed position comprises driving the vehicle forward; and
the step of locking the rearward end of the receiver by engaging a locking mechanism to fixedly connect the receiver to the tow bar.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

Figure 1:
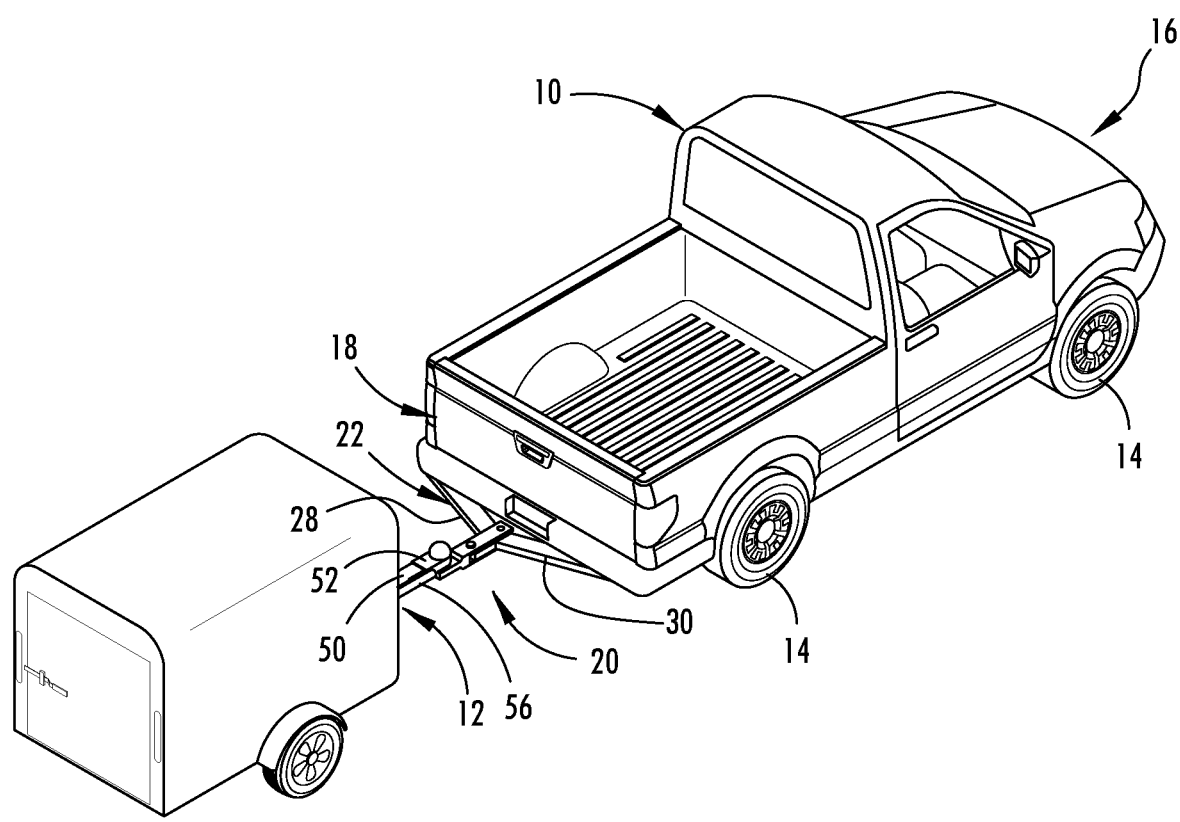
FIG. 1 is a rear perspective view of a vehicle equipped with a hitch assembly for towing a trailer, according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a wheeled motor vehicle 10 is generally illustrated as a tow vehicle having a vehicle hitch assembly 20 connected to a trailer 12 for towing the trailer 12. The vehicle 10 may be a truck, car, SUV, van, bus or any other vehicle capable of towing a trailer. The vehicle 10 generally has a plurality of wheels 14, a front end 16 and a rear end 18. The vehicle hitch assembly 20 is fixedly connected at the rear end 18 of the vehicle 10 such as to the vehicle frame to enable a trailer 12 to be connected thereto such that the vehicle 10 may pull or tow the trailer 12 in the forward direction or push the trailer 12 backward in the rearward direction.

The vehicle hitch assembly 20 is shown in FIGS. 2-8 without the motor vehicle 10 and in relation to a front portion of the trailer 12. The vehicle hitch assembly 20 has an angled trailer tow bar 22 configured to be supported at or near the rear end 18 of the vehicle 10. The hitch assembly 20 also includes a floating hitch receiver 40 movably coupled to the tow bar 22 such that the hitch receiver 40 may move on or relative to the tow bar 22 amongst a plurality of positions. The hitch assembly 20 further includes a locking mechanism for locking the receiver 40 in a fixed position at or near a center of the tow bar 22. As such, the floating hitch receiver 40 may be moved to various positions on the tow bar 22 to allow for engagement of the hitch receiver 40 with a trailer coupler on the trailer 12. The hitch receiver 40 may move by sliding motion on the tow bar 22 to any of a number of unfixed positions to align the receiver 40 to connect with the trailer 12 and is further movable by a sliding motion to the fixed position at the center of the tow bar 22 to provide for normal trailer towing once the receiver 40 is locked in place on the tow bar 22.

Figure 2:
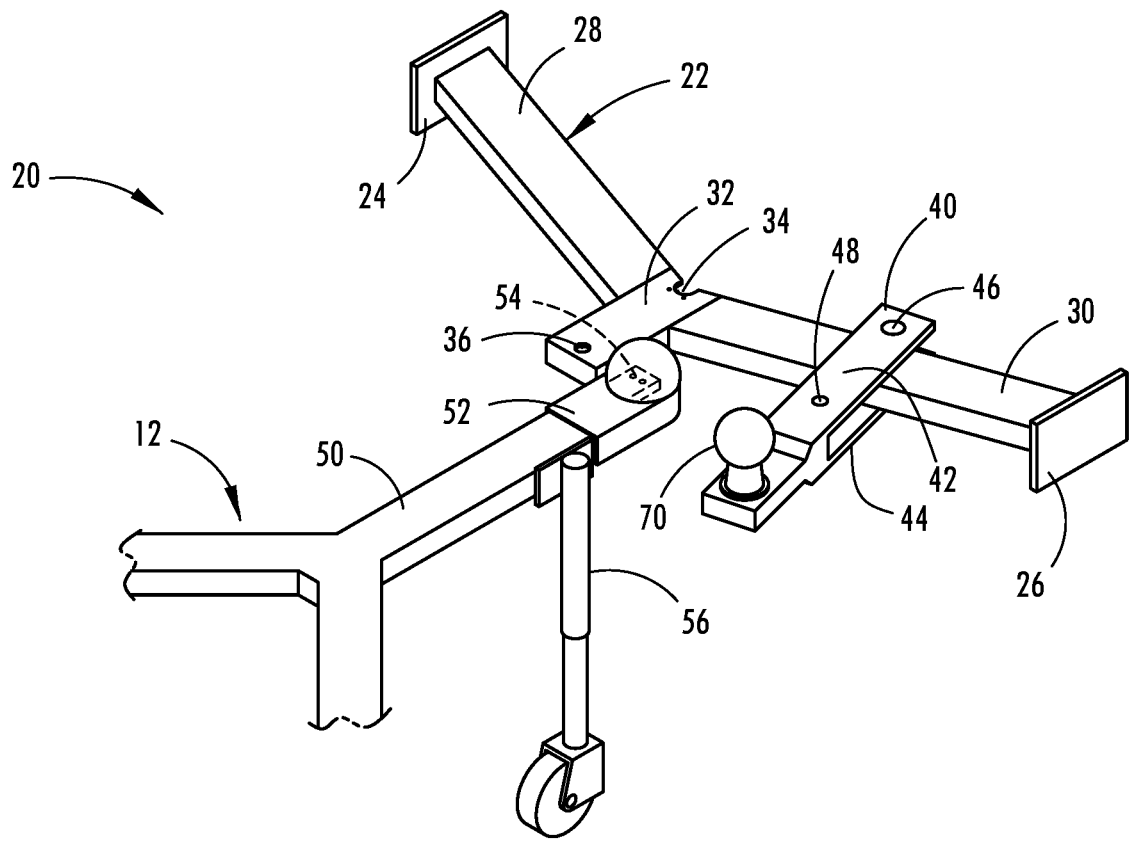
FIG. 2 is a rear perspective view of the hitch assembly and a portion of the trailer disconnected from the hitch assembly and with a hitch receiver in a first position.
Figure 3:
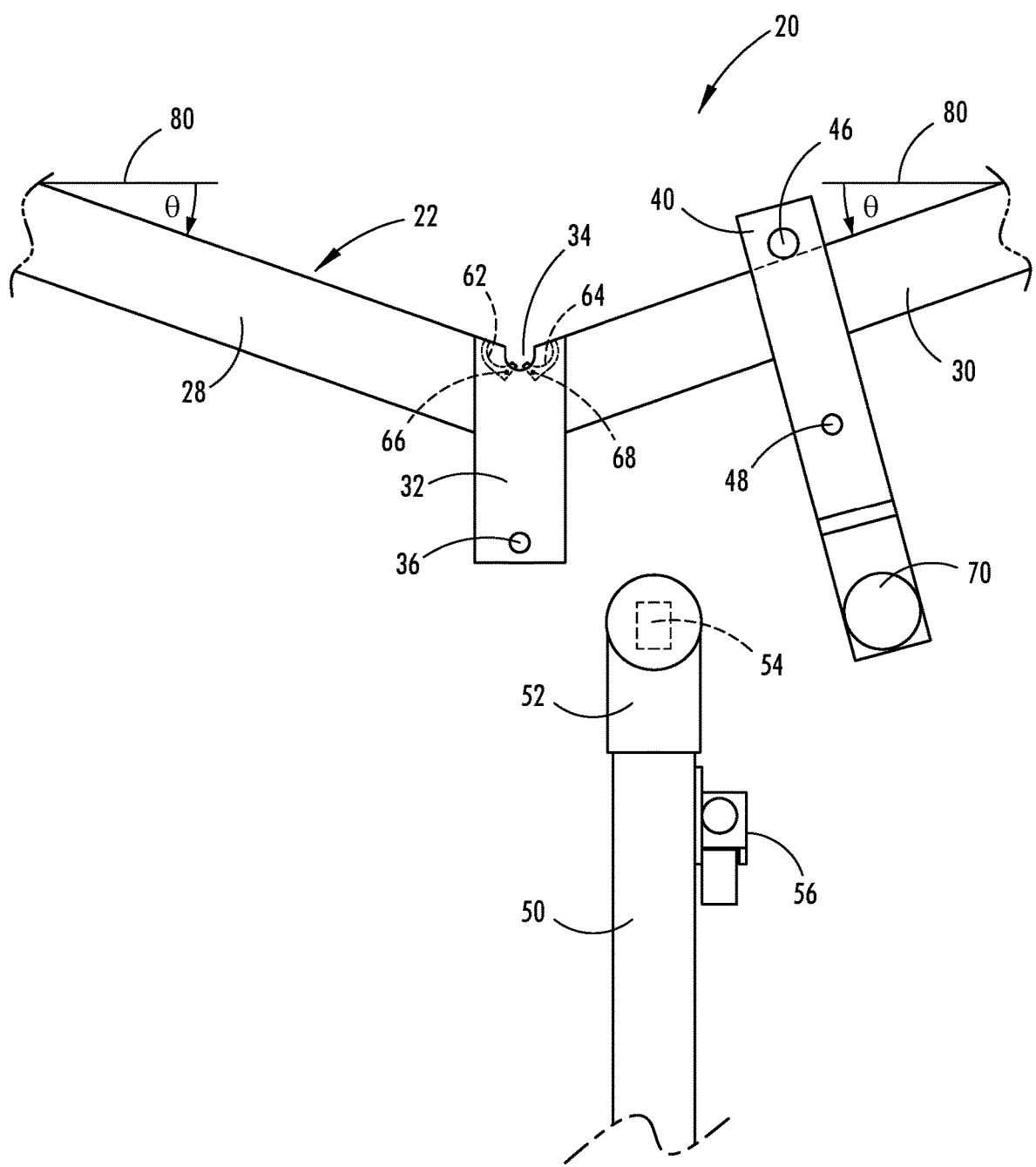
FIG. 3 is a top view of the hitch assembly disconnected from the trailer and with the hitch receiver in the first position shown in FIG. 2.

The vehicle hitch assembly 20 is shown in FIGS. 2 and 3 with the trailer 12 disconnected from the hitch assembly 20. The trailer 12 generally includes a trailer tongue 50 on the front end thereof generally extending on a longitudinal axis of the trailer 12. The trailer tongue 50 is shown having a jack 56 operable to adjust elevation of the tongue 50 and a trailer coupler 52 at the forward end of the trailer 12. The trailer coupler 52 may include a coupler latch 54 having a shape and size configured to engage a hitch ball 70 on the floating hitch receiver 40 of the vehicle hitch assembly 20. With the hitch ball 70 engaged in a connected position on the trailer coupler 52, the vehicle 10 may tow the trailer 12 and the trailer 12 may pivot about the connection with an articulation or hitch angle.

The angled trailer tow bar 22 is shown having mounting plates 24 and 26 on opposite lateral ends for mounting the tow bar 22 to the frame of the vehicle 10, such as fastening via bolts or welding the mounting plates 24 and 26 to the vehicle frame. The trailer tow bar 22 has at least one angled portion first and second angled bars 28 and 30 which extend from respective mounting plates 24 and 26 to a central plate 32. The first and second angled bars 28 and 30 extend from the corresponding mounting plates 24 and 26 laterally and rearward at an angle θ relative to a lateral axis 80 of the vehicle. The angle θ is greater than 3 degrees, according to one embodiment. The angle θ may be in the range of 3 to 25 degrees, or more specifically within the range of 5 to 10 degrees according to more specific embodiments. The first and second angled bars 28 and 30 extend laterally inward towards one another and rearward at angle θ from the mounting plates 24 and 26, respectively toward the central plate 32 so as to form a generally V-shaped tow bar 22. It should be appreciated that each of the first and second angled bars 28 and 30 include angled portions that angle rearward.

The floating hitch receiver 40 is assembled onto the tow bar 22 and is configured to move, such as by sliding motion along the tow bar 22 to various positions in order to allow the hitch receiver 40 to be connected to the coupler 52 of a trailer at any position along the length of the tow bar 22. The hitch receiver 40 has an upper arm 42 that extends above the tow bar 22 and a lower arm 44 that extends below the tow bar 22. The upper arm 42 and lower arm 44 are connected at the rear end and extend generally parallel to one another. The outer front ends of the upper arm 42 and lower arm 44 are connected together via a first pin 46 that may be fixed in place such that the floating hitch receiver 40 remains trapped on the tow bar 22. In one embodiment, the first pin 46 has a cylindrical shape such that the floating hitch receiver 40 is able to slide along the tow bar 22 when initially connecting to the trailer 12. In one embodiment, the first pin 46 may have a sleeve that may form a roller such that the hitch receiver 40 more easily slides on the tow bar 22 during movement of the hitch receiver 40 on the tow bar 22. The first pin 46 may be fixed in place and configured not to be removable, according to one embodiment. In another embodiment, the first pin 46 may be a removable pin that can be removed and reassembled by a user.

The floating hitch receiver 40 is shown in FIGS. 2 and 3 in a first position moved away from the center plate 32 such that the hitch receiver 40 may be positioned closer to the trailer coupler 52 of the disconnected trailer 12. The floating hitch receiver 40 may be moved along the tow bar 22 to a position to better enable the trailer coupler 54 to be connected to the hitch ball 70. In addition to sideways movement on the tow bar 22, the hitch receiver 40 may rotate clockwise and counterclockwise due to the space between first pin 46 and the interconnection of arms 42 and 44 exceeding the width of the tow bar 22 to allow the hitch ball 70 to align with the trailer coupler 52. As such, a driver of the vehicle 10 may drive the vehicle 10 in reverse to a position in which the hitch ball 70 is somewhere close to the tow bar 22 but is not aligned with the trailer coupler 54 and may move the floating hitch receiver 40 along the tow bar 22 via sliding and rotating motion to align the hitch receiver 40 and hitch ball 70 with the trailer coupler 52. Once the trailer coupler 52 is aligned with the hitch ball 70, a user may connect the trailer coupler 54 to the hitch receiver ball 70 and lock the connected pieces in place with the latch 54. Once the trailer 12 is connected to the hitch receiver 40, the hitch receiver 40 may be moved by sliding motion to a fixed center location on center plate 32. This sliding movement of the receiver 40 may be achieved by driving the vehicle 10 forward such that the hitch receiver 40 slides on the angled trailer tow bar 22 due to the trailer load and the rearward angled first and second arms 28 and 30.

Figure 4:
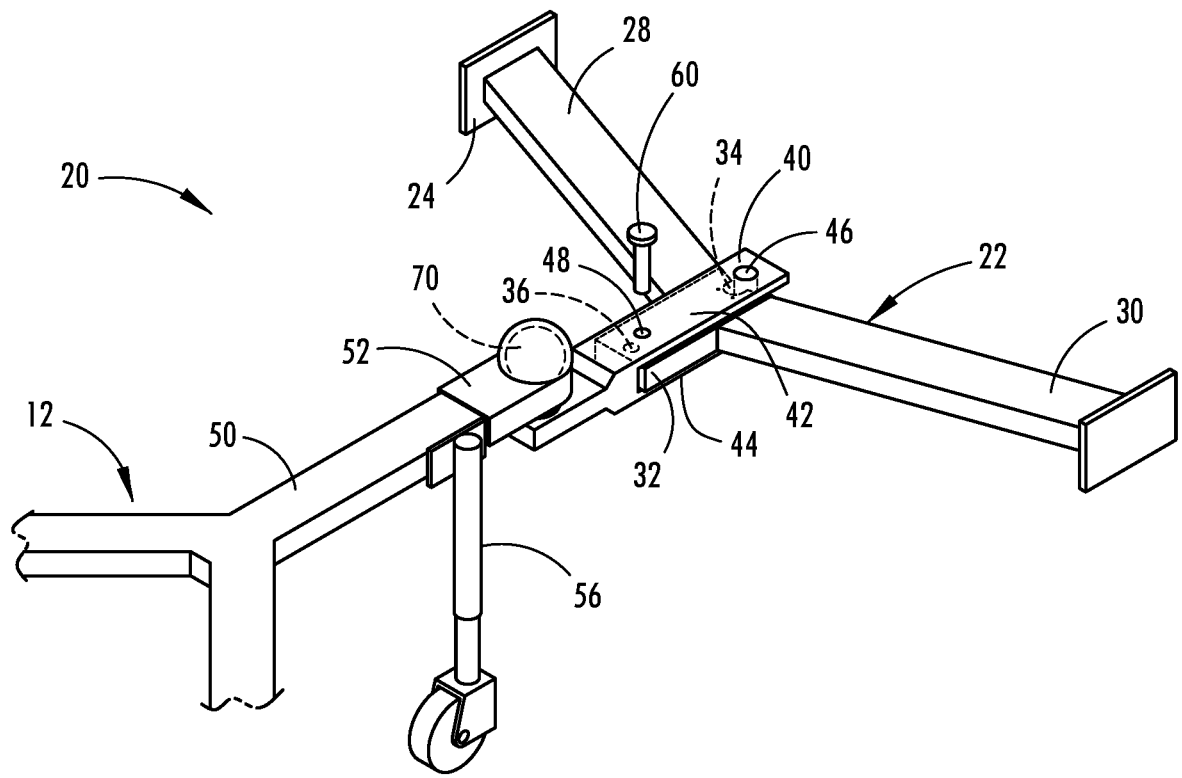
FIG. 4 is a rear perspective view of the hitch assembly shown connected to the trailer via the hitch receiver and moving into a second fixed position.
Figure 5:
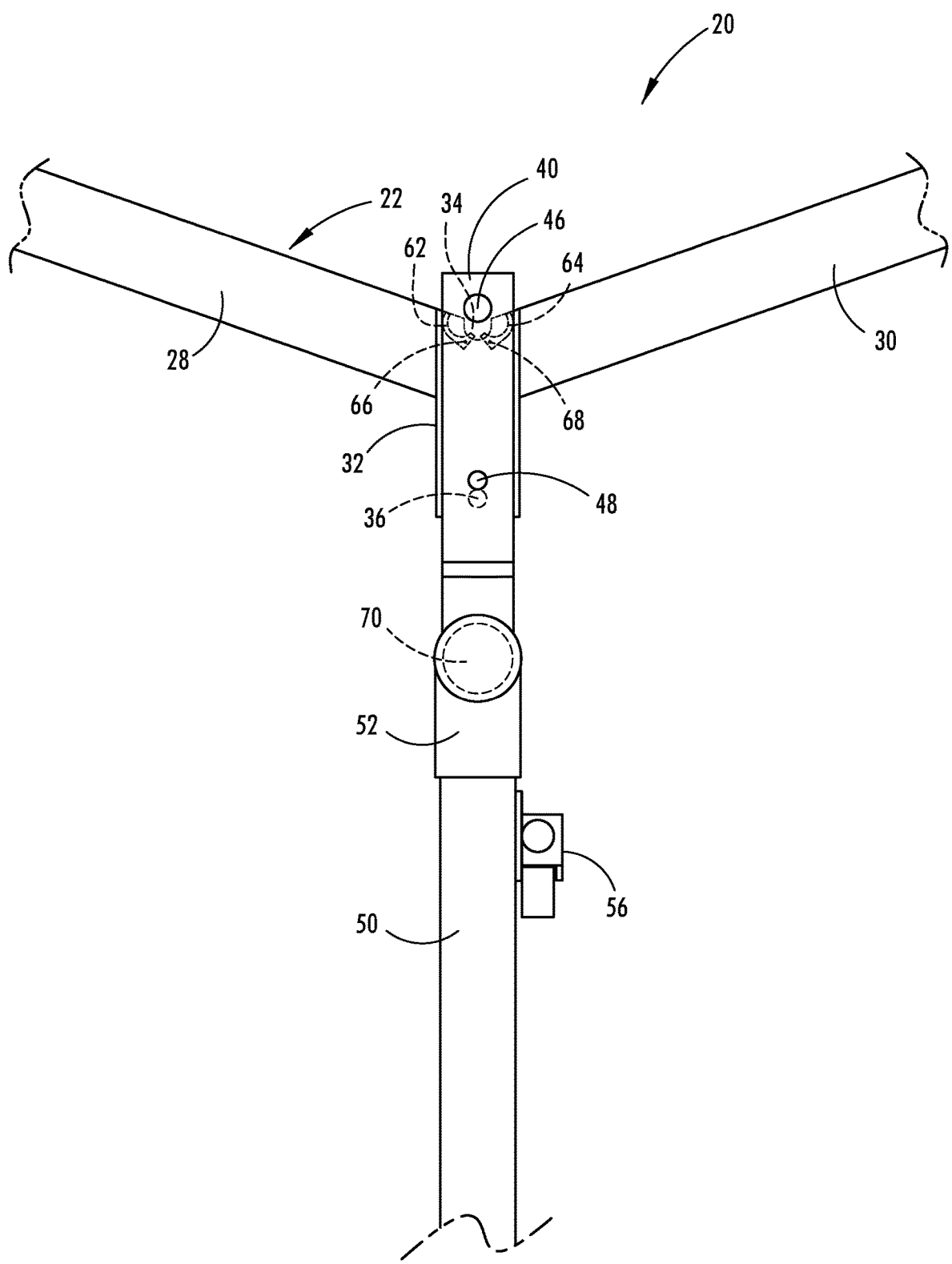
FIG. 5 is a top view of the hitch assembly and trailer with the hitch receiver moving into the second fixed position shown in FIG. 4.

Once the floating hitch receiver 40 reaches the center plate 32, the first pin 46 may slide into position to engage a forward slot 34 formed in the front side of center plate 32 as seen in FIGS. 4 and 5. In this position, the slot 34 engaging first pin 46 prevents lateral and rearward movement of the hitch receiver 40. In order to prevent forward movement of the hitch receiver 40 in this position, a second pin 60 is inserted within aligned openings 48 on the hitch receiver 40 and opening 36 on the center plate 32. The first pin 46 engaged within slot 34 and second pin 60 engaged within openings 48 and 36 thereby rigidly fixes the hitch receiver 40 to the tow bar 22 and prevents sliding and rotational movement of the hitch receiver 40.

In addition, first and second articulating jaws 62 and 64 are provided on the center plate 32 for engaging the first pin 46 in the fixed position of the hitch receiver 40. The first and second articulating jaws 62 and 64 may include first and second springs 66 and 68, respectively. First and second springs 66 and 68 may be over-center springs that maintain the position of the articulating jaws 62 and 64 in the open or closed position. As such, the articulating jaws 62 and 64 engage the first pin 46 and rotate to a closed position to capture the first pin 46 when positioned within the slot 34 and retain the hitch receiver 40 in the fixed position. It should be appreciated that each of the articulating jaws 62 and 64, the first pin 46 engaged in slot 34 and the second pin 60 engaged in openings 36 and 48 form locking mechanisms for locking the receiver 40 in the fixed position on the tow bar 22. The vehicle hitch assembly 40 may employ one or more of these locking mechanisms to lock the receiver in a fixed position on the tow bar 22.

Figure 6:
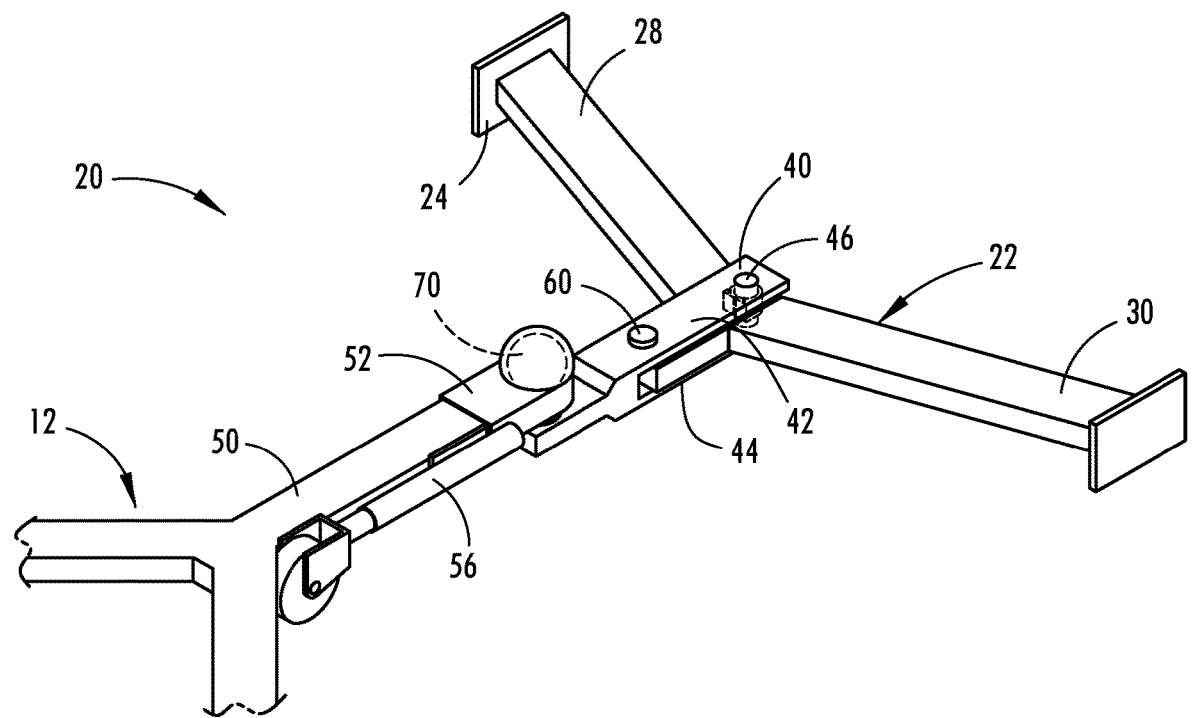
FIG. 6 is a rear perspective view of the hitch assembly connected to the trailer with the hitch receiver in the second fixed position and locked in place.
Figure 7:
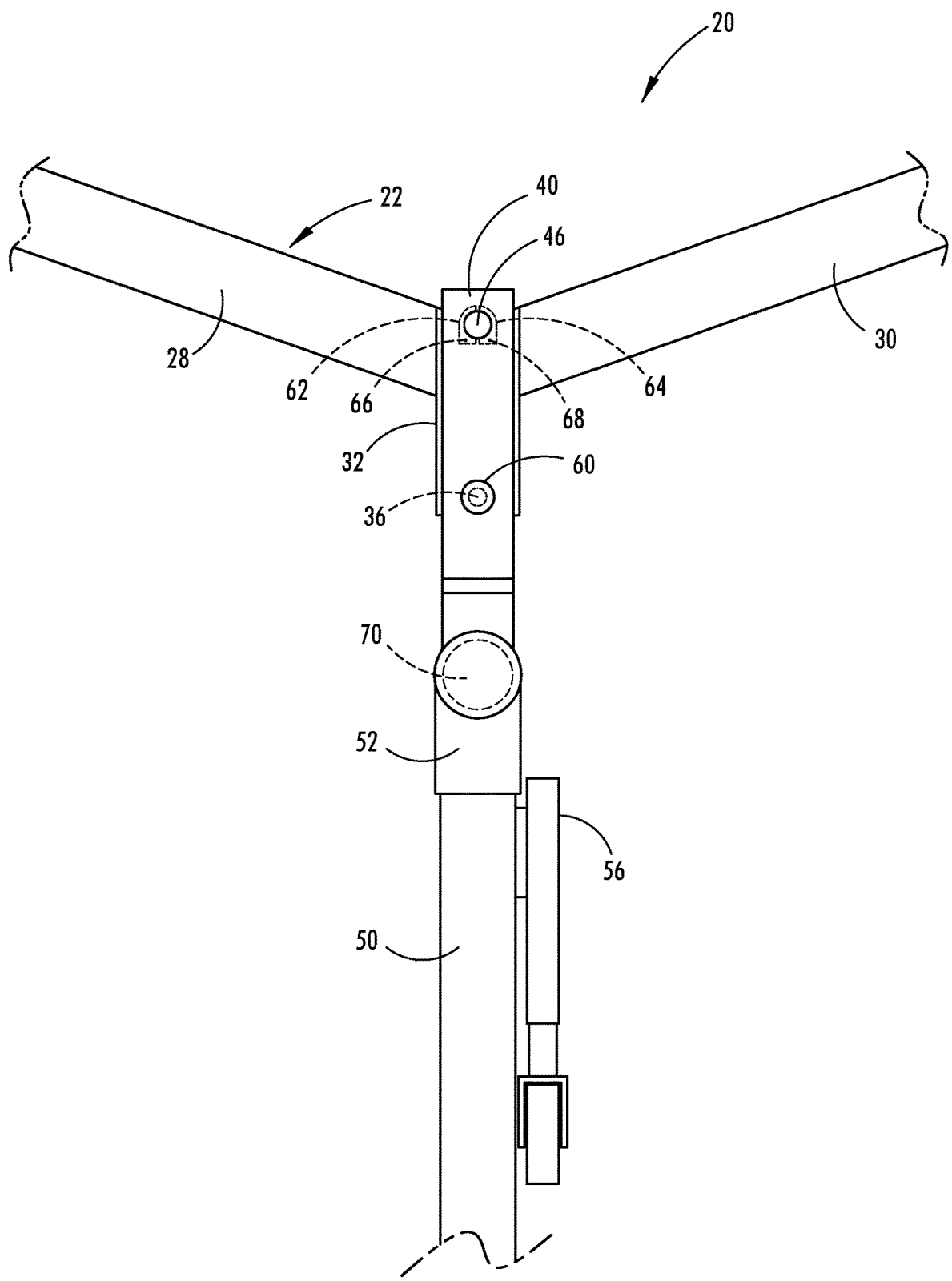
FIG. 7 is a top view of the hitch assembly and trailer with the hitch receiver further locked in the second fixed position as shown in FIG. 7.
Figure 8:
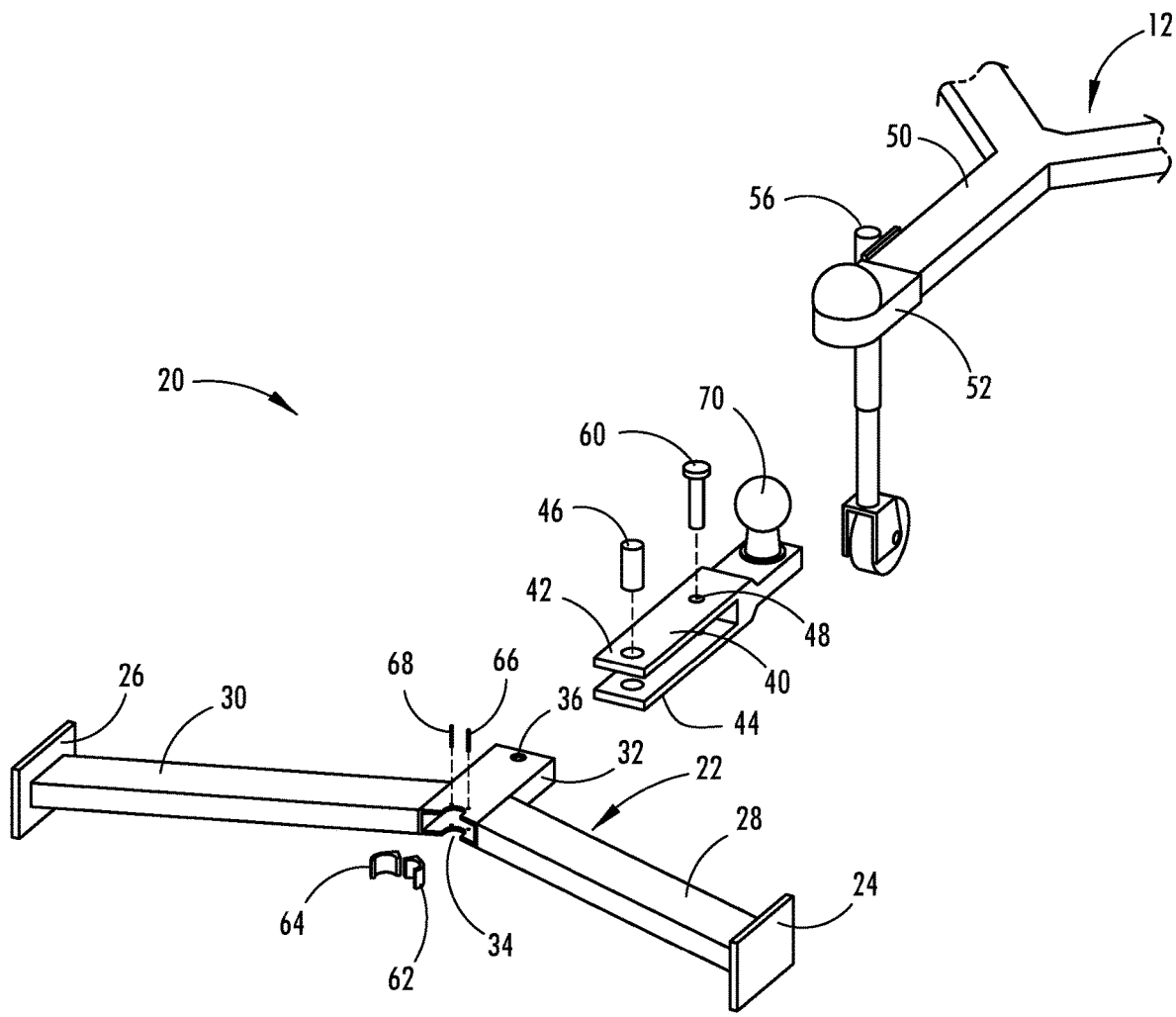
FIG. 8 is a front exploded view of the hitch assembly and trailer with the hitch receiver in the second fixed position.

As seen in FIGS. 6 and 7, with the articulating jaws 62 and 64 capturing the first pin 46 and the second pin 60 positioned within openings 36 and 48, the hitch receiver 40 is fixedly mounted in the fixed position on the tow bar 22. In this fixed position, the vehicle hitch assembly 20 is configured to allow the vehicle 10 to tow the trailer 12 during normal vehicle trailer driving.

The vehicle hitch assembly 20 enables a user to connect a trailer 12 to the tow vehicle 10 by using the following method of operation. The user may drive the vehicle 10 in reverse to align the trailer coupler 54 of a trailer in position near the angled trailer tow bar 22 on the vehicle 10. The user may then move the floating hitch receiver 40 on the tow bar 22 by sliding and rotating the receiver 40 to align the hitch receiver 40 with the trailer coupler 54. The user may connect the trailer coupler 52 to the hitch receiver 40 by latching the trailer coupler 52 onto the hitch ball 70. The hitch receiver 40 may then be moved by sliding motion on the tow bar 22 to the rearward fixed position at the center of the tow bar 22. This may be achieved by driving the vehicle 10 forward such that the weight of the trailer 12 pulls the floating hitch receiver 40 rearward such that it slides on the angled tow bar 22 until it reaches the rearmost center position where the first pin 46 engages the slot 34 on the center plate 32 and the articulating jaws 62 and 64 rotate to the closed position. Once in the fixed position with first pin 46 engaged in slot 34, the hitch receiver 40 may be further locked in the fixed position by inserting second locking pin 60 is into the floating hitch receiver 40 and center plate 32 to fully lock the rearward end of the hitch receiver 40.

Accordingly, a vehicle hitch assembly 20 is provided that enables a user to connect a trailer 12 to the vehicle 10 with a lessened requirement for alignment of the trailer coupler 54 and hitch ball 70. The hitch assembly 20 thereby makes it easier for a user to connect the trailer 12 to the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle hitch assembly comprising:
   an angled trailer tow bar configured to be supported at the rear of a vehicle;
   a hitch receiver movably coupled to the tow bar such that the receiver may move on the tow bar, wherein the receiver has upper and lower arms and a first pin at a front side extending between the upper and lower arms; and
   a locking mechanism for locking the receiver in a fixed position on the tow bar, wherein the locking mechanism Comprises a pair of articulating jaws that engage the first pin when positioned within a slot.

2. The vehicle hitch assembly of claim 1, wherein the angled trailer tow bar has an angled portion at an angle greater than 3 degrees.

3. The vehicle hitch assembly of claim 2, wherein the angle is in the range of 3 to 25 degrees.

4. The vehicle hitch assembly of claim 3, wherein the angle is in the range of 5 to 10 degrees.

5. The vehicle hitch assembly of claim 1, wherein the tow bar has the slot, wherein the first pin engages the slot when the hitch receiver is in the fixed position to provide the locking mechanism.

6. The vehicle hitch assembly of claim 5, wherein the receiver further has a second pin rearward of the first pin such that the first and second pins are on opposite front and rear sides of the tow bar, and wherein the second pin fixedly connects the hitch receiver to the tow bar in the fixed position to further provide the locking mechanism.

7. The vehicle hitch assembly of claim 1, wherein the articulating jaws are spring biased by one or more springs.

8. A vehicle hitch assembly comprising:
   a trailer tow bar having rearward angled members configured to be supported at the rear of a vehicle;
   a floating hitch receiver movably coupled to the tow bar such that the receiver is movable to different positions on the tow bar, wherein the receiver has upper and lower arms and a first pin at a front side extending between the upper and lower arms; and
   a locking mechanism for locking the receiver in a fixed position on the tow bar, wherein the locking mechanism comprises a pair of articulating jaws that engage the first pin when positioned within a slot.

9. The vehicle hitch assembly of claim 8, wherein the angled trailer tow bar has an angled portion at an angle greater than 3 degrees.

10. The vehicle hitch assembly of claim 9, wherein the angled portion has an angle in the range of 3 to 25 degrees.

11. The vehicle hitch assembly of claim 8, wherein the tow bar has the slot, wherein the first pin engages the slot when the floating hitch receiver is in the fixed position to provide the locking mechanism.

12. The vehicle hitch assembly of claim 11, wherein the receiver further has a second pin at a rearward of the first pin such that the first and second pins are on opposite front and rear sides of the tow bar, and wherein the second pin fixedly connects the receiver to the tow bar in the fixed position to further provide the locking mechanism.

13. The vehicle hitch assembly of claim 8, wherein the articulating jaws are spring biased by one or more springs.

14. A method of connecting a trailer to a tow vehicle, comprising:
   aligning a trailer coupler in position near an angled trailer tow bar on a vehicle;
   moving a floating hitch receiver on the tow bar to align the receiver with the trailer coupler, wherein the receiver has upper and lower arms and a first pin at a first side extending between the upper and lower arms;
   connecting the trailer coupler to the floating hitch receiver;
   sliding the floating hitch receiver on the tow bar to a rearward fixed position; and
   locking the receiver in the fixed position with a locking mechanism, wherein the locking mechanism comprises a pair of articulating jaws that engage the first pin when positioned within a slot on the tow bar.

15. The method of claim 14, wherein the step of moving the receiver to the fixed position comprises driving the vehicle forward.

16. The method of claim 14 further comprising the step of locking the rearward end of the receiver by engaging a locking mechanism to fixedly connect the receiver to the tow bar.

* * * * *